L. Caswell,
Double-Acting Pump,
Nº 1,610.  Patented May 19, 1840.
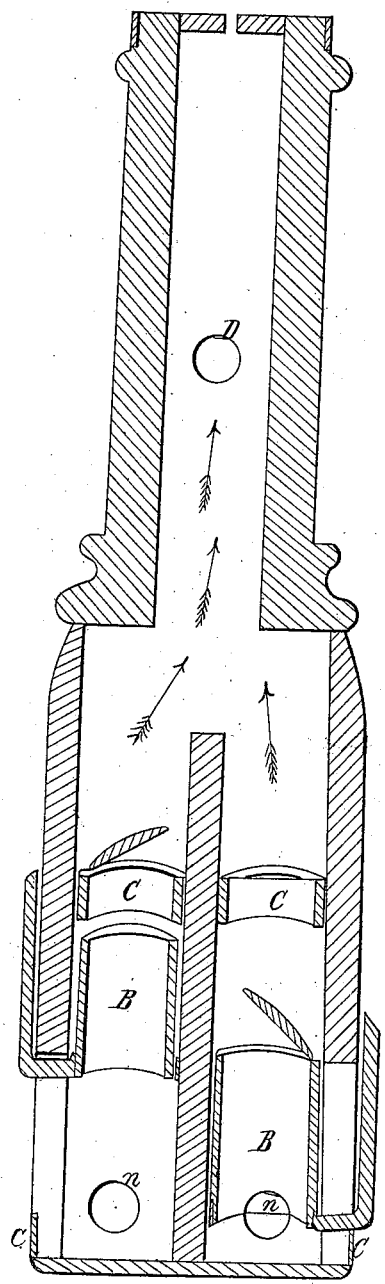
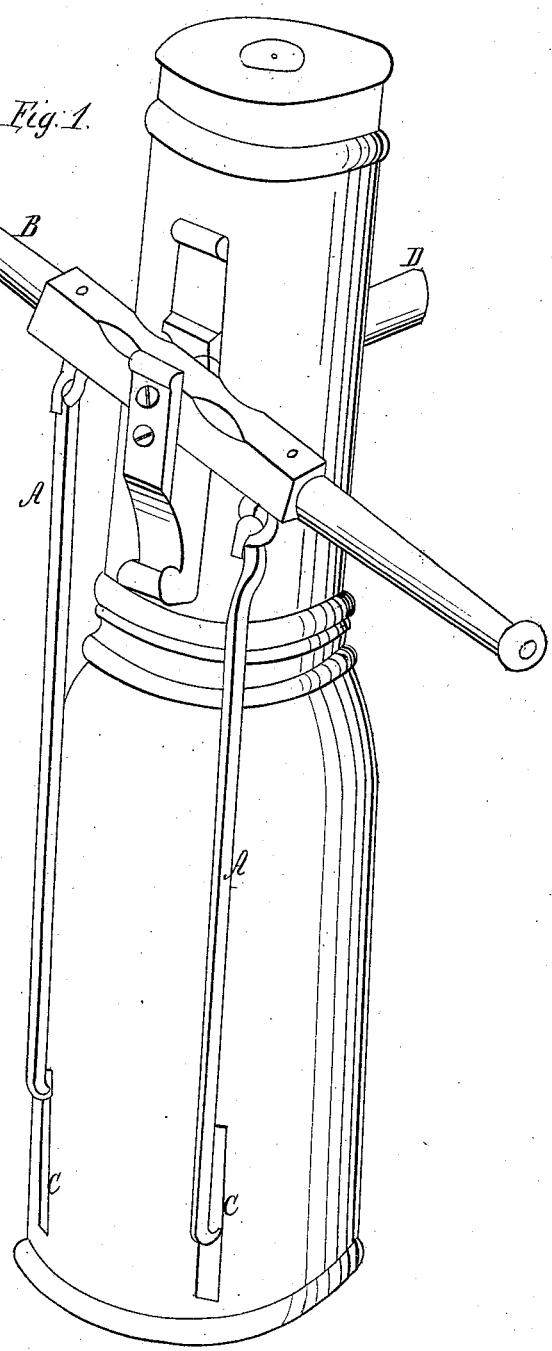

UNITED STATES PATENT OFFICE.

LEBBEUS CASWELL, OF HARRISON, MAINE.

PUMP.

Specification of Letters Patent No. 1,610, dated May 19, 1840.

*To all whom it may concern:*

Be it known that I, LEBBEUS CASWELL, of Harrison, in the county of Cumberland and State of Maine, have invented new and useful Improvements in Pumps, which, constructed with my said improvements, I call "Caswell's Engine-Pump;" and I do hereby declare that the following is a full and exact description of the same.

The nature of my invention consists in the method of applying the power for the purpose of raising the water, or other fluid, into and forcing it from the pump and in the use, for that purpose, of two or more tubes combined in the pump.

To enable others skilled in the art to make and use my invention, I describe its construction and operation, as follows: I take the tube or body of the common pump and place in it, instead of the upper or movable box, a box fixed in its place with a valve similar to the lower box in the common pump; and in the lower end of the tube I place a movable box, or piston, with a valve which lower box, or piston, is raised and depressed within the tube, by an iron or other suitable rod, which I call the piston rod, and which extends from the pump handle down the outside of the pump and is connected with the piston. An oblong aperture is made through the side of the pump at the bottom to admit the part, which passes from the piston rod to the piston, and which connects them, to be moved up and down. The connection between the piston rod and piston may be formed in any convenient mode; it may be by a bend in the piston rod, the end of which may be made to pass through the oblong aperture and be fastened to a ring or hoop encircling the piston; or the connection may be formed by a short bar one end of which is fastened to the ring or hoop encircling the piston and the other to the piston rod. There may be one aperture, or more, in the lower end of the pump, in addition to the oblong aperture, for the admission of water into the tube. When the pump is placed in the water and the handle is raised, the piston will be depresed, and the water will flow into the tube through the valve in the piston, and when the pump handle is brought down the piston will be raised and the water, in the tube below the upper box, will be forced up through the valve of the upper box into the upper chamber of the pump, and by repeatedly raising and depressing the piston, the water will be made to fill the upper chamber of the pump and to flow from the spout, or from the upper end of the tube, if the spout be closed. The pump handle is fixed to and rests upon a support, or fulcrum, fastened upon the outside and near the top of the pump.

A pump, constructed as above described, will raise water, not only to the height of thirty-three feet, as in the common suction pump, but to any height to which it may be desirable to raise it; the height, to which the water may be raised, depending not upon the weight of the atmosphere, but upon the power applied to the piston, and upon the length of the pump and of the tube, or hose, that may be attached to it.

To produce and maintain a constant and uninterrupted stream of water from the pump and to increase its quantity and the force with which it may be thrown, I construct the pump with two tubes, in the lower part of it, parallel with each other, not, however, communicating one with the other, but each opening into the upper chamber of the pump by the valve in the upper box, each tube being furnished with boxes and pistons, as above described—the upper chamber being the common reservoir of the water raised through both tubes.

The handle of the pump with two tubes is made double, that is, it extends a suitable length in both directions from its support, or fulcrum, on the side of the pump, and the piston rods are attached, in any convenient mode, to the handle, on each side of the fulcrum and at a convenient distance therefrom:—power being applied at each end of the handle, the pistons are raised and depressed alternately, in quick succession, and the water is forced into the upper chamber in such quantity that a constant and uninterrupted stream is maintained; and it may be forced through any tube, or hose, fixed to the spout, or to the top of the pump, the spout being closed, to any height and in any direction desired.

The pump may be constructed with four tubes in the lower part, through all which water may, at the same time, be forced into the upper chamber in the manner above described.

A pump constructed in manner aforesaid unites all the advantages and produces the effects of the common suction and forcing pumps combined and without the use of the principle of the suction pump.

The pump with my improvements may be constructed of wood, or metal, or partially of both, and upon a small or a large scale;— it may be used for any purpose for which common pumps are used, and it may be used for the purposes of fire engines or extinguishers; for raising water into the upper apartments of high buildings; for a vessel pump, a deck washer and sail sprinkler, and for many other purposes.

What I claim, as my invention and desire to secure by Letters Patent, is—

The method of applying the power to the lower hose, or pistons, for the purpose of forcing water into and through the pump, and the method of increasing the force and effect of the pump by the use of two or more tubes combined, as described in the foregoing specification.

LEBBEUS CASWELL.

Witnesses:
SOLOMON ANDREWS,
THOMAS H. MEAD.